United States Patent [19]
Jurgensen et al.

[11] 4,217,610
[45] Aug. 12, 1980

[54] VARIABLE START MULTIBURST SIGNAL GENERATOR

[75] Inventors: David J. Jurgensen, Gaston; Howard A. Landsman, Beaverton, both of Oreg.

[73] Assignee: Tektronix, Inc., Beaverton, Oreg.

[21] Appl. No.: 945,731

[22] Filed: Sep. 25, 1978

[51] Int. Cl.² ............................................. H04N 7/02
[52] U.S. Cl. ...................................... 358/139; 358/10
[58] Field of Search ................... 358/139, 10; 325/31, 325/67, 363

[56] References Cited

U.S. PATENT DOCUMENTS

| | | |
|---|---|---|
| 3,529,079 | 9/1970 | Moskovitz et al. ................... 358/10 |
| 3,534,155 | 10/1970 | Rhodes ................................. 358/10 |
| 3,702,375 | 11/1972 | Jurgensen ............................. 358/10 |

*Primary Examiner*—Richard Murray
*Attorney, Agent, or Firm*—William D. Haffner

[57] ABSTRACT

A multifrequency burst test signal generator for use in testing television equipment is described. The starting position of the multiburst signals is progressively delayed throughout the television field thereby filling the burst packets. Also the shape of the burst packets is modified to reduce the spurious sideband signals created by the signal generator switching circuits.

8 Claims, 9 Drawing Figures

VARIABLE START MULTIBURST SIGNAL GENERATOR

BACKGROUND OF THE INVENTION

There is a need for quality control in the field of broadcasting in order to ensure that the composite video signal is maintained without distortion throughout the video system. To this end, various test signals have been developed to test the quality of the video system. One of the more widely used test signals is the multifrequency burst, hereinafter referred to as multiburst.

The multiburst test signal is produced by a multiburst generator. This generator produces a series of equal-amplitude bursts or packets of sine waves from 0.5 MHz to 4.2 MHz (NTSC television system) or from 0.5 MHz to 5.8 MHz (PAL television system) and white and black reference levels. The output also contains composite sync so that the complete signal will pass in the normal manner through various television equipment and circuits. Multiburst is generally used for a quick check of gain versus frequency response. The signal is passed through the video equipment and monitored on an oscilloscope. The video equipment's response to the various frequency bursts is apparent by their relative amplitudes.

This multiburst signal is usually generated by successively switching a function generator or a series of oscillators on for a short time. However, the high-speed switching circuitry used produces undesirable harmonic-frequencies or sidebands that may interfere with other video equipment.

SUMMARY OF THE INVENTION

In accordance with the present invention, the starting position of multiburst signals supplied to the output switch of the multiburst generator is progressively changed in proportion to a ramp occurring at the television field rate (59.94 Hz in the NTSC system). The result is that on an oscilloscope triggered at the television line rate (15,734.26 Hz in the NTSC system), the multiburst packets will be filled with closely spaced traces of burst frequency. Additionally the shape of the burst packets is modified by switching the burst signals with a controlled risetime signal at the line rate.

It is therefore an object of the present invention to provide a multiburst signal with controllably shaped burst packets which eliminate unwanted sideband signals.

It is another object of the present invention to provide a multiburst signal that provides a more accurate display of burst amplitude.

The subject matter of the present invention is particularly pointed out an distinctly claimed in the following description. The invention, however, both as to organization and method of operation together with further advantages and objects thereof may best be understood by reference to the following description taken in conjunction with the accompanying drawings. It is to be understood, however, that the embodiments described are not intended to be exhausting nor limiting of the invention but are for the purpose of illustration in order that others skilled in the art may fully understand the invention and principles thereof and the manner of applying it in particular use so that they may modify it in various forms, each as may best be suited to the conditions of the particular use.

DESCRIPTION OF THE PREFERRED EMBODIMENT

Figure 1:
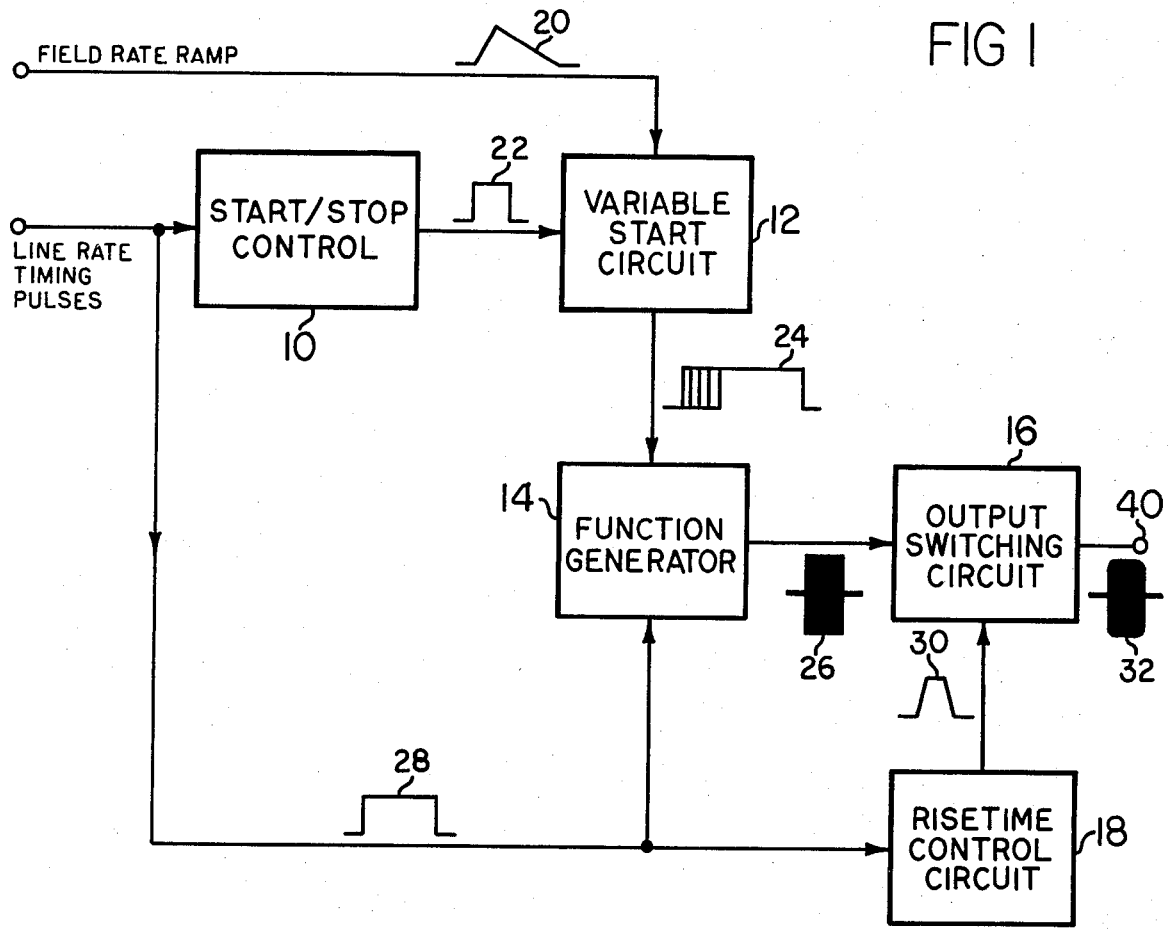
FIG. 1 is a block diagram of the circuit for providing the multiburst signal of the present invention.

FIG. 1 includes a variable start circuit 12 which is controlled by a negative-going ramp 20 at the television field rate. Variable start circuit 12 also receives a start or run signal 22 from the start/stop control 10. This circuit also includes a function generator 14 for supplying the bursts of sine wave signals to output switching circuit 16. Risetime control circuit 18 modifies line-rate pulse 28 to produce the switching pulse 30.

The start/stop control 10 of FIG. 1 is of the type that generates a rectangular run signal such as signal 22 at the television line rate. Run signal 22 is ordinarily directly connected to function generator 14 which generates the usual packets of six frequencies comprising the multiburst signal. During one line scanning period a burst of each of the six frequencies is developed. The signals are normally the same amplitude. One way to construct the function generator is to successively enable six oscillators by a chain of multivibrator gates. Various other circuits, including a programmable function generator, may be used.

As previously mentioned, the run signal generated by start/stop control 10 is normally connected directly to function generator 14. In the present invention, however, the run signal 22 is first modified by the variable start circuit 12. Voltage ramp 20 is applied to the variable start circuit 12 at the television field rate. During each ramp the starting point of the run signal is progressively delayed such that an oscilloscope display triggered at the television line rate will appear as signal 26 in FIG. 1.

Figure 5:
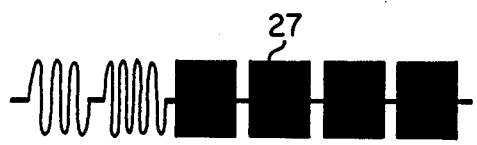
FIG. 5 is a representation of an oscilloscope display of the output of the function generator of FIG. 1 as it would appear if the variable start circuit were disabled.
Figure 6:
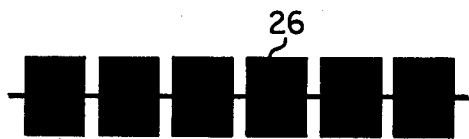
FIG. 6 is a representation similar to FIG. 5 when the variable start circuit of FIG. 1 is not disconnected.

In the absence of the variable start circuit 12, the multiburst signal at the output of function generator 14 would appear on an oscilloscope screen as signal 27 in FIG. 5. Variations in the amplitude of the individual sine waves within the burst packets may occur, but may go unnoticed if, for example, the display were expanded horizontally for closer inspection. Any variations in amplitude may be easily viewed in the oscilloscope display of FIG. 6 resulting from progressively delaying the starting point of function generator run signal.

Figure 2:
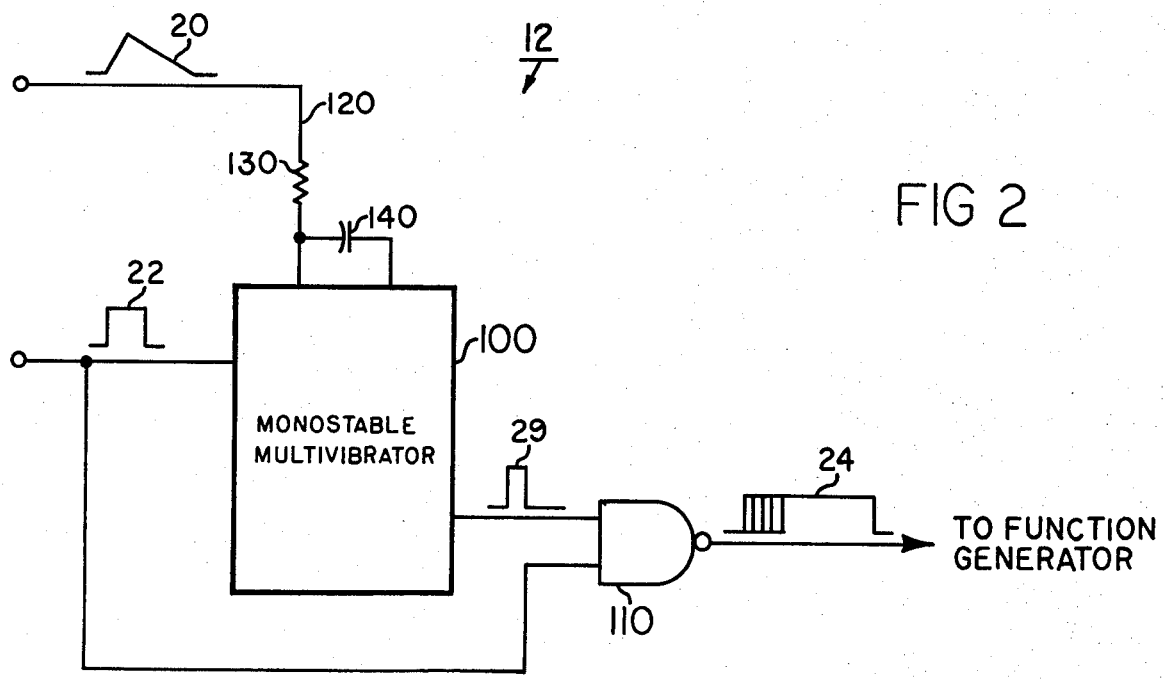
FIG. 2 is a schematic diagram of the variable start circuit of FIG. 1.
Figure 3:
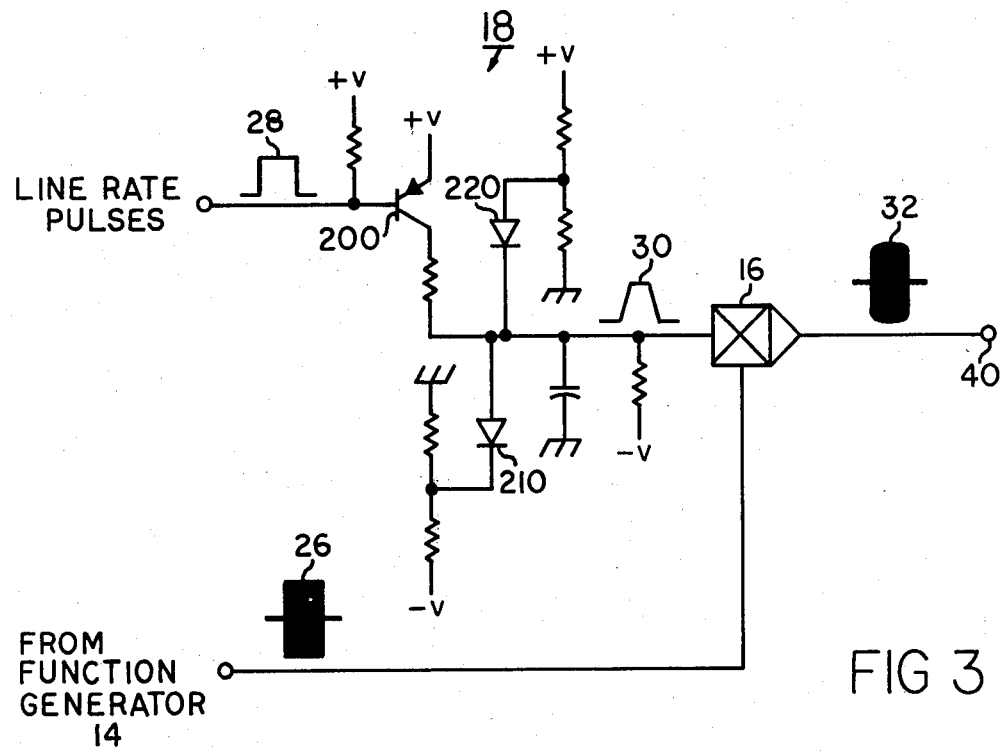
FIG. 3 is a combination schematic and block diagram of the risetime control and the output switching circuit of FIG. 1.

A circuit for progressively delaying the function generator run signal is shown in FIG. 2. The inputs to this circuit are the run signal 22 and the field-rate ramp 20. The run signal 22 is connected to the trigger input of monostable multivibrator 100 and the field-rate ramp 20 is applied to the timing input of monostable multivibrator 100. A third input to the circuit in FIG. 3 is line-rate signal 22 to NAND gate 110. Line-rate signal 28 and the output pulse 29 from monostable multivibrator 100 are the two inputs to NAND gate 110. The modified run signal 24 is the output of NAND gate 110.

Figure 7:
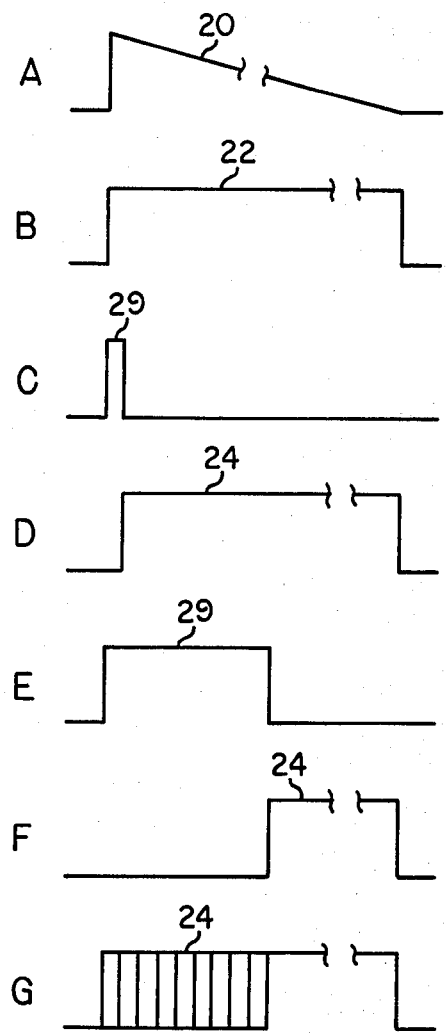
FIG. 7 shows the various signals present in the variable start circuit of FIG. 2.

The width of output pulse 29 is established by the charging time of the RC network of resistor 130 and capacitor 140 which are connected to the timing input of monostable multivibrator 100. In this circuit the width of output pulse 29 is progressively widened by progressively increasing the RC network charging time. The charging time is increased throughout each television field by decreasing the charging current applied to the RC network 130-140. The progressively decreasing field-rate ramp 20 supplies the progressively decreasing charging current and the width of output pulse 29 is increased proportionally. Output pulse 29 is combined with line-rate pulse 28 in NAND gate 110 to produce the results shown in FIG. 7. In FIG. 7 are shown representative oscilloscope traces of the signals of the variable start circuit 12. Trace A depicts the decreasing field-rate ramp 20 and trace C depicts output pulse 29 from the monostable multivibrator 100 when field-rate ramp 20 is near its peak at the beginning of the field. Output pulse 29 and line-rate pulse 28 are logically combined in NAND gate 110 to produce the modified run signal 24 shown in trace D. Trace E depicts output pulse 29 later in the television field (when the field-rate ramp has run down) and trace F represents the modified run signal 24 at the same time. Trace G depicts the modified run signal as it would appear on an oscilloscope triggered at the television line rate. As mentioned previously, progressively delaying the run signal as described above results in a signal from function generator 14 such as that shown in FIG. 6.

The filled burst packets 26 from the function generator 14 would normally be connected directly to output terminal 40. However, the present invention shapes these burst packets to eliminate the sideband signals generated by the fast switching rates of the function generator 14. The shaping is accomplished by passing the burst packets through a switching circuit that is controlled by a switching waveform having controlled rise and fall times.

FIG. 3 is a suitable circuit for shaping the burst packets. The circuit includes the output switching circuit 16 and risetime control 18. The input signals to this circuit are, of course, the burst packets 26 and the line-rate pulse 28. Output switching circuit 16 is an analog balanced multiplier and can be a commercially available device such as a MC1595. The risetime control 18 includes transistor 200 and diodes 210 and 220.

By way of operation, the line-rate pulse 28 is fed to the base of PNP transistor 200 where it is shaped into switching pulse 30. When the line-rate pulse 28 is positive, the waveform at the collector of transistor 200 gradually increases until it reaches the limit set by diode 210. The output waveform remains at this level until the line rate pulse 28 goes low. At that point the output pulse gradually falls until it reaches the lower limit set by diode 220. The result is switching pulse 30 as it appears in FIG. 3. This switching pulse, along with the burst packets, is applied to analog balanced multiplier 16.

Figure 8:
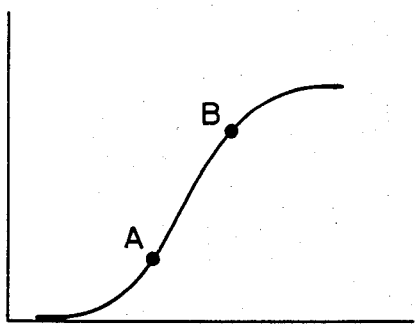
FIG. 8 is a representation of the response of the analog multiplier of FIG. 3 to an input switching pulse.

Full-wave balanced multiplication takes place in multiplier 16 between the burst packets 26 and the switching pulse 30. Multiplier 16 further modifies the burst packets by shaping the switching function into an approximate sine wave. This is accomplished by operating the multiplier in its non-linear switching region. FIG. 8 is a graph of the response of a typical multiplier to an input switching voltage.

Figure 9:
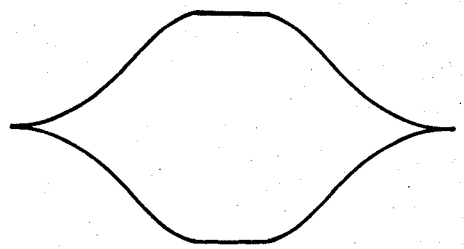
FIG. 9 is a representation of the approximate sine wave envelope developed by the analog multiplier of FIG. 3.

This response curve is due to the well known non-linear properties of transistor junctions. Therefore, in order to produce linear switching, the switching pulse is normally constrained to be between points A and B in the graph. However, in the present invention the switching pulse drives the multiplier into its non-linear operating region in order to obtain the approximate sine wave envelope surrounding the burst packet shown in FIG. 9. The result of shaping the burst packets is the elimination of the sideband signals that are normally generated by multiburst generators.

Figure 4:
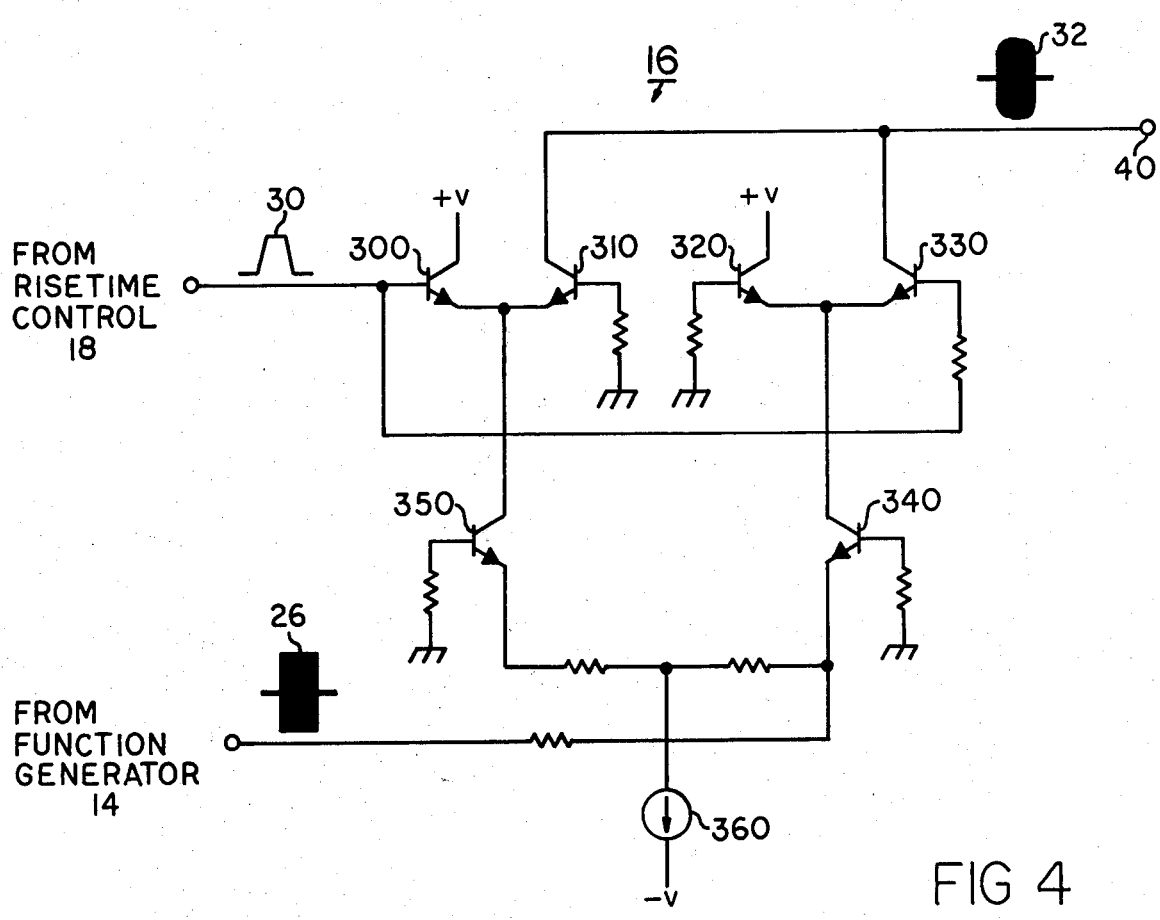
FIG. 4 is a schematic of one embodiment of the output switching circuit of FIG. 1.

FIG. 4 shows another embodiment of multiplier 16. In this instance the multiplier is constructed using discrete transistors or a monolithic transistor array. The inputs to the multiplier are the switching pulse 30 and burst packets 26. The operation of this circuit is essentially the same as the operation of the multiplier in FIG. 3. Transistor pairs 300-310 and 320-330 are each operating as single-pole double-throw switches. They switch between the burst packets and the dc current supplied by current source 360 according to switching pulse 20. Since these switches are current-mode gates with cross-coupled collectors, full-wave balanced multiplication results between the burst packets and the switching pulse. The previously-described approximate sine wave envelope is also produced by this circuit in the same manner.

While there has been shown and described the preferred embodiments of the present invention, it will be apparent to those skilled in the art that many changes and modifications may be made without departing from the invention in its broader aspects. Therefore, the appended claims are intended to cover all such changes and modifications that fall within the true spirit and scope of the invention.

We claim:

1. A multifrequency burst test signal generator for testing television video equipment, the signal generator comprising:
   means triggered by a run signal at the television line rate for generating sine wave signals, said sine wave generating means producing individual packets of sine waves at predetermined frequencies; and
   means responsive to said run signal and to a ramp signal at the television field rate for progressively delaying the starting point of said sine waves generated by said sine wave generating means.

2. A multifrequency burst test signal generator for testing television video equipment, the signal generator comprising:
   means for generating bursts of sine wave signals at a plurality of predetermined frequencies;
   output means for providing said bursts of sine wave signals to the television video equipment being tested; and means responsive to a switching signal at the television line rate for controllably switching said bursts of sine wave signals to said output means.

3. A multifrequency burst test signal generator for testing television video equipment, the signal generator comprising:

means triggered by a run signal at the television line rate for generating sine wave signals, said sine wave signal generating means producing individual packets of sine waves at predetermined frequencies;

means responsive to said run signal and to a ramp signal at the television field rate for progressively delaying the starting point of said sine waves generated by said sine wave generating means;

output means for providing said packets of sine waves to the television video equipment being tested; and means responsive to a switching signal at the television line rate for controllably switching said packets of sine waves to said output means.

4. The test signal generator according to claim 1 or 3 further comprising means responsive to a pulse at the television line rate for generating said run signal.

5. The test signal generator according to claim 1 or 3 wherein said delay means comprises a delay element whose amount of delay decreases in direct proportion to the current applied thereto.

6. The test signal generator according to claim 5 wherein said delay element includes a variable pulse width monostable multivibrator.

7. The test signal generator according to claim 2 or 3 further comprising means for shaping said switching signal so as to alter the risetimes thereof and eliminate spurious sideband signals.

8. The test signal generator according to claim 2 or 3 wherein said switching means comprises an analog balanced multiplier.

* * * * *